US009735716B2

(12) United States Patent
Vuletic et al.

(10) Patent No.: US 9,735,716 B2
(45) Date of Patent: Aug. 15, 2017

(54) MULTI-PHASE MACHINE CURRENT CONTROL

(71) Applicant: Infineon Technologies AG, Neubiberg (DE)

(72) Inventors: Radovan Vuletic, Munich (DE); Dian Tresna Nugraha, Munich (DE)

(73) Assignee: Infineon Technologies AG, Neubiberg (DE)

( * ) Notice: Subject to any disclaimer, the term of this patent is extended or adjusted under 35 U.S.C. 154(b) by 96 days.

(21) Appl. No.: 14/693,598

(22) Filed: Apr. 22, 2015

(65) Prior Publication Data

US 2016/0315566 A1 Oct. 27, 2016

(51) Int. Cl.

| | |
|---|---|
| ***H02P 1/04*** | (2006.01) |
| ***H02P 1/00*** | (2006.01) |
| ***H02P 6/00*** | (2016.01) |
| ***H02P 6/18*** | (2016.01) |
| ***B60L 15/20*** | (2006.01) |
| ***H02P 21/00*** | (2016.01) |
| ***B60K 6/00*** | (2006.01) |
| ***B60W 10/00*** | (2006.01) |
| *H02P 6/08* | (2016.01) |
| *H02P 27/08* | (2006.01) |

(52) U.S. Cl.

CPC ................ *H02P 6/002* (2013.01); *B60K 6/00* (2013.01); *B60L 15/20* (2013.01); *B60W 10/00* (2013.01); *H02P 6/18* (2013.01); *H02P 21/0003* (2013.01); *B60L 2240/423* (2013.01); *B60L 2260/44* (2013.01); *H02P 6/08* (2013.01); *H02P 27/08* (2013.01)

(58) Field of Classification Search

CPC .... H02P 6/002; H02P 6/08; H02P 6/18; H02P 25/22

USPC .................................................... 318/400.09

See application file for complete search history.

(56) References Cited

U.S. PATENT DOCUMENTS

| | | | | |
|---|---|---|---|---|
| 9,172,317 | B2 * | 10/2015 | Ishida | H02P 25/22 |
| 2006/0044847 | A1 * | 3/2006 | Baumgart | H02M 1/12 363/37 |
| 2010/0315030 | A1 * | 12/2010 | Koenig | H02P 25/08 318/400.15 |
| 2013/0328517 | A1 * | 12/2013 | Gerdes | H02P 25/0805 318/701 |

OTHER PUBLICATIONS

Graovac, "Permanent Magnet Synchronous Motor with Sinusoidal Flux Distribution," Infineon, Oct. 2006, 25 pp.

U.S. Appl. No. 14/693,451, by Radovan Vuletic, filed Apr. 22, 2015.

(Continued)

*Primary Examiner* — Bentsu Ro

*Assistant Examiner* — Zemenay Truneh

(74) *Attorney, Agent, or Firm* — Shumaker & Sieffert, P.A.

(57) ABSTRACT

A controller for controlling a multi-phase motor is described. The controller may be configured to drive a first virtual multi-phase motor in an active mode and drive a second virtual multi-phase motor in a passive mode. In the active mode, at least a portion of a reference torque is distributed to the first virtual multi-phase motor. In the passive mode, zero torque is distributed to the second virtual multi-phase motor.

20 Claims, 8 Drawing Sheets

400

401

411

$T_{Ref}$ TORQUE DISTRIBUTOR 420

$V_{DC}$ $\omega_e$ $T_{ref1}$ $\Psi_{corr1}$ TORQUE CONTROLLER 402 $I_{dq,ref1}$ CURRENT CONTROLLER 404 $V_{dq,ref1}$ PULSE MODULATOR 406 Duty Cycle$_1$ $V_{DC}$ $\omega_e$ $T_{ref2}$ $\Psi_{corr2}$ TORQUE CONTROLLER 412 $I_{dq,ref2}$ CURRENT CONTROLLER 414 $V_{dq,ref2}$ PULSE MODULATOR 416 Duty Cycle2

(56) References Cited

OTHER PUBLICATIONS

Meyer et al., "Optimum Control for Interior Permanent Magnet Synchronous Motors (IPMSM) in Constant Torque and Flux Weakening Range," 12th International Power Electronics and Motion Control Conference, EPE-PEMC 2006, Aug. 30-Sep. 1, 2006, 5 pp.

Meyer, M. et al., "Optimum Control for Interior Permanent Magnet Synchronous Motors (IPMSM) in Constant Torque and Flux Weakening Range," IEEE, 12th International Power Electronics and Motion Control Conference, Aug. 30-Sep. 1, 2006, pp. 282-286.

Li, J. et al., "Field-weakening Control Algorithm for Interior Permanent Magnet Synchronous Motor Based on Space-Vector Modulation Technique," Journal of Convergence Information Technology (JCIT), vol. 8, No. 3, Feb. 2013, 9 pp.

* cited by examiner

MULTI-PHASE MACHINE CURRENT CONTROL

TECHNICAL FIELD

This disclosure relates to multi-phase machines, and more particular, to techniques and circuits associated with multi-phase machines.

BACKGROUND

Operation of multi-phase motors requires a dedicated by a controller. At low speeds, multi-phase motors can be controlled according to maximum torque per ampere (MTPA) and maximum torque per flux (MTPF) conditions. At high speeds (speeds above rated speeds), field weakening may be used to control multi-phase motors.

SUMMARY

The disclosure describes techniques and systems for improving operation of a multi-phase machine.

In some examples, the disclosure is directed to a controller for controlling a multi-phase motor is described. The controller may be configured to drive a first virtual multi-phase motor in an active mode and drive a second virtual multi-phase motor in a passive mode. In the active mode, at least a portion of a reference torque is distributed to the first virtual multi-phase motor. In the passive mode, zero torque is distributed to the second virtual multi-phase motor.

In some examples, the disclosure is directed to a method of controlling a multi-phase motor. The method may include driving a first virtual multi-phase motor in an active mode and driving a second virtual multi-phase motor in a passive mode. In the active mode, at least a portion of a reference torque is distributed to the first virtual multi-phase motor. In the passive mode, zero torque is distributed to the second virtual multi-phase motor.

In some examples, the disclosure is directed to a system including a multi-phase motor system and a controller for controlling the multi-phase motor system. The controller may be configured to drive a first virtual multi-phase motor in an active mode and drive a second virtual multi-phase motor in a passive mode. In the active mode, at least a portion of a reference torque is distributed to the first virtual multi-phase motor. In the passive mode, zero torque is distributed to the second virtual multi-phase motor.

The details of one or more examples are set forth in the accompanying drawings and the description below. Other features, objects, and advantages of the disclosure will be apparent from the description and drawings, and from the claims.

DETAILED DESCRIPTION

The disclosure describes techniques for controlling a multi-phase machine, such as a machine that includes a multi-phase permanent magnet synchronous motor. The multi-phase machine may include a controller. The controller may be configured to generate a reference current and a reference voltage. In some examples, the controller may determine a flux correction value that may be used to adjust the reference current and reference voltage. Accordingly, the controller may control the multi-phase motor when the motor operates at speeds in the field weakening range. In some examples, the controller may be configured to control the multi-phase motor as a plurality of virtual multi-phase motors, which may provide redundant control of the multi-phase motor. The controller may determine a flux correction value for each virtual multi-phase motor, which may force each virtual multi-phase motor to the same field weakening level. Accordingly, the controller may synchronize the virtual multi-phase motors, which may reduce the risk of damage to the permanent magnet, extend the life-span of the multi-phase machine, and enable the multi-phase machine to operate more efficiently.

In some examples, the controller may be configured to allocate a reference torque among a plurality of virtual multi-phase motors. In some examples, the controller may shut down one virtual multi-phase motor or allocate zero torque to one of the virtual multi-phase motors. The controller may retain control of the multi-phase motor if one or more phases are nonoperational by allocating torque to a redundant virtual multi-phase motor that is still operational. In some examples, shutting down a given virtual multi-phase motor or allocating zero torque to a given virtual multi-phase motor may improve one or more operational characteristics of the multi-phase machine. The controller may detect harmonics in the multi-phase machine and use harmonics cancellation techniques to minimize harmonics in the multi-phase machine. Accordingly, the controller may improve operation of the multi-phase machine by reducing harmonics, reducing current or torque ripple, and reduce acoustic noise in the multi-phase machine.

Figure 1:
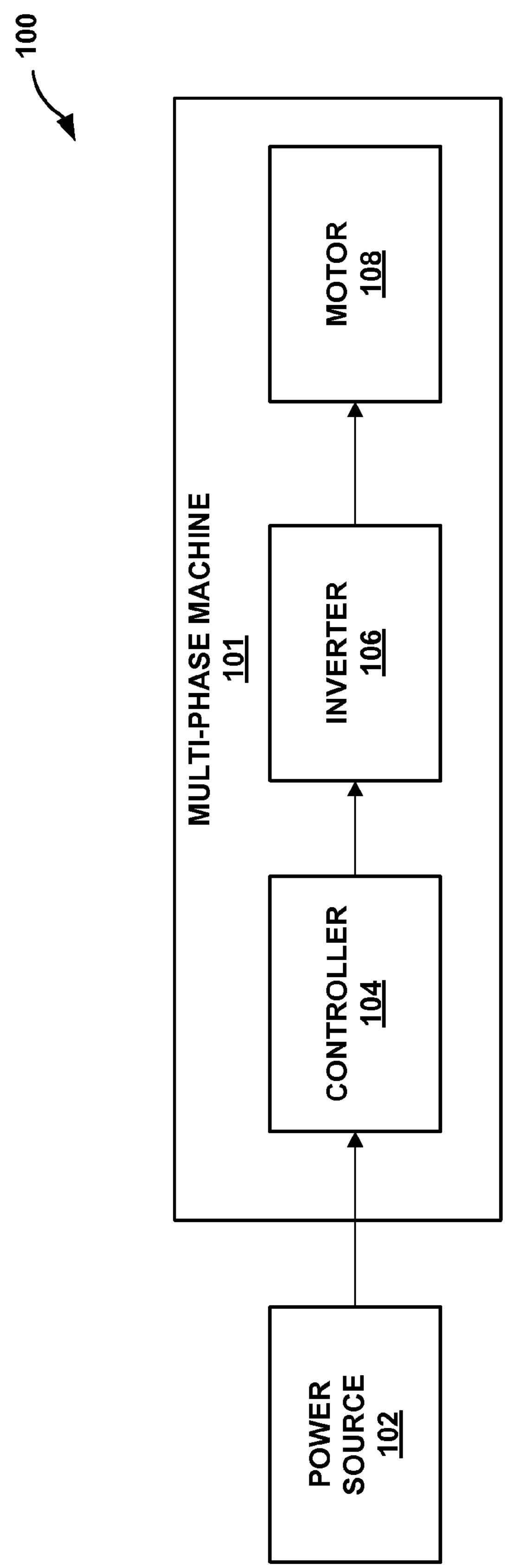
FIG. 1 is a block diagram illustrating an example system for operating a multi-phase machine, in accordance with one or more aspects of this disclosure.

FIG. 1 is a block diagram illustrating an example system 100 for operating a multi-phase machine 101, in accordance with one or more aspects of this disclosure. FIG. 1 shows system 100 as having separate and distinct components, shown as power source 102 and multi-phase machine 101, however system 100 may include additional or fewer components. For instance, power source 102, controller 104, inverter 106, and motor 108 may be four individual components or may represent a combination of one or more components that provide the functionality of system 100 as described herein.

System 100 may include power source 102 which provides electrical power to motor 108. For example, when power source 102 comprises a generator or generators, transformers, batteries, solar panels, or regenerative braking systems, system 100 may include power source 102. In other examples, system 100 may be separate from power source 102. For example, when power source 102 comprises power grids, generators, transformers, external batteries, external solar panels, windmills, hydro-electrical or wind-powered generators, or any other form of devices that are capable of providing electrical power to system 100, system 100 may be separate from power source 102. As described above, numerous examples of power source 102 exist and may include, but are not limited to, power grids, generators, transformers, batteries, solar panels, windmills, regenerative braking systems, hydro-electrical or wind-powered generators, or any other form of devices that are capable of providing electrical power to system 100.

Multi-phase machine 101 may comprise any machine with three or more phases. For example, multi-phase machine 101 may include three phases, four phases, five phases, six phases, or potentially any plurality of phases. In general, multi-phase machine 101 may include N phases, where N is any positive integer greater than two. Each phase in the N-phase motor 108 may be offset or shifted from the other phases, which may create a rotating field. For example, each phase may be offset by $$\frac{360}{N}$$

degrees or $$\frac{2\pi}{N}$$

radians.

Multi-phase machine 101 may include controller 104, inverter 106, and multi-phase motor 108. In some examples, multi-phase machine 101 may include electric or hybrid vehicles. Electric or hybrid vehicles include passenger vehicles, commercial vehicles, all-terrain vehicles, watercraft, aircraft, or any other type of vehicle. However, multi-phase machine 101 is not limited to vehicles and may include any machine with a multi-phase motor 108.

In some examples, controller 104 may be configured to treat multi-phase machine 101 as a plurality of virtual multi-phase machines. For example, multi-phase machine 101 may include a single six-phase motor 108 and controller 104 may be configured to treat the six-phase motor 108 as two virtual three-phase motors. In some examples, multi-phase machine 101 may include a nine-phase motor 108 and controller 104 may be configured to treat the nine-phase motor as a plurality of virtual multi-phase motors. For example, a first virtual motor may include four phases and a second virtual motor may include 5 phases. In general, controller 104 may be configured to virtualize multi-phase machine 101 as M virtual multi-phase motors, where M is any positive integer. Each virtual multi-phase motor may include any number of phases so long as the total number of phases of the virtual multi-phase motors equals the N-phases of multi-phase motor 108. In some examples, each virtual multi-phase motor may include the same number of phases. However, in some examples, at least one virtual multi-phase motor may have a different number of phases than at least one other virtual multi-phase motor.

The ability of controller 104 to virtualize multi-phase machine 101 as M virtual multi-phase motors may provide redundant control of multi-phase machine 101. In some examples, controller 104 may be configured to virtually control a six-phase motor 108 as two redundant three-phase motors such that, should some phases of the first virtual three-phase motor become non-operational, controller 104 may still control multi-phase motor 108 via the second virtual three-phase motor. In some examples, redundant control of multi-phase machine 101 may improve safety or reliability by maintaining control of multi-phase machine 101 if one or more phases become non-operational. The ability of controller 104 to virtualize multi-phase machine 101 may also provide performance benefits. In some examples, operation of multi-phase machine 101 may be more efficient when operating with a subset of the N-phases rather than utilizing all N-phases of multi-phase machine 101. For example, controller 104 may be configured to virtually control a six-phase motor 108 as two three-phase motors such that controller 104 may shut off one set of three phases and control multi-phase motor 108 with only three phases.

Inverter 106 includes an N-phase inverter, where N is the same number of phases of the N-phase machine 101. Inverter 106 includes one or more switches (e.g., MOS power transistor based switches, gallium nitride (GaN) based switches, or other types of switch devices) that are controlled by controller 104, according to one or more modulation techniques. Controller 104 may include one or more gate drivers and control logic to control (e.g., turn-on and turn-off) the one or more switches using modulation techniques. The modulation of the switches may operate according to pulse density modulation (PDM), pulse width modulation (PWM), pulse frequency modulation (PFM), or another suitable modulation technique. In PWM, the width (i.e., duration) of the pulse is modulated based on a modulator signal. In PDM, the relative density of a pulse corresponds to an analog signal's amplitude. In PFM, the frequency of a pulse train is varied based on the instantaneous amplitude of the modulating signal at sampling intervals. By controlling the switches of inverter 106 using modulation techniques, controller 104 may regulate operation of multi-phase motor 108.

In some examples, multi-phase motor 108 may include a permanent magnet synchronous motor (PMSM). A PMSM may include a shaft, rotor, stator, and permanent magnet. A permanent magnet may be mounted on or in the rotor. In some examples, the permanent magnet may be surface mounted to the rotor, inset in the rotor, or buried within the rotor. In some examples, the permanent magnet may be an interior magnet. The permanent magnet may include rare-earth elements, such as Neodymium-Iron-Boron (NdFeB), Samarium-Cobalt (SmCo), or a Ferrite (e.g., Barium (Ba) or Strontium (Sr)). In some examples, the permanent magnet may include a protective coating such as a layer of Gold (Au), Nickel (Ni), Zinc (Zn), or the like. In operation, a PMSM generates stator phase currents in a three-phase vector domain (e.g., a three-phase reference system: $I_a$, $I_b$, and $I_c$). Multi-phase machine 101 may include sensors for detecting and measuring the stator currents $I_a$, $I_b$, and $I_c$, motor velocity $\omega_e$, and rotor position.

Controller 104 may control operation of multi-phase motor 108. In some examples, controller 104 may control multi-phase motor 108 using vector control, also known as field oriented control (FOC). Controller 108 may perform a Clarke transformation (also known as the alpha-beta transformation) and Park transformation to transform from the 3-phase vector domain to a 2-dimensional DQ domain (e.g., a two phase reference system: $I_d$, $I_q$), which allows for decoupling of the $I_d$ and $I_q$ current. Controller 104 may adjust the $I_d$ current to control the flux of multi-phase motor 108 and adjust the $I_q$ current to control torque of multi-phase motor 108.

Figure 2:
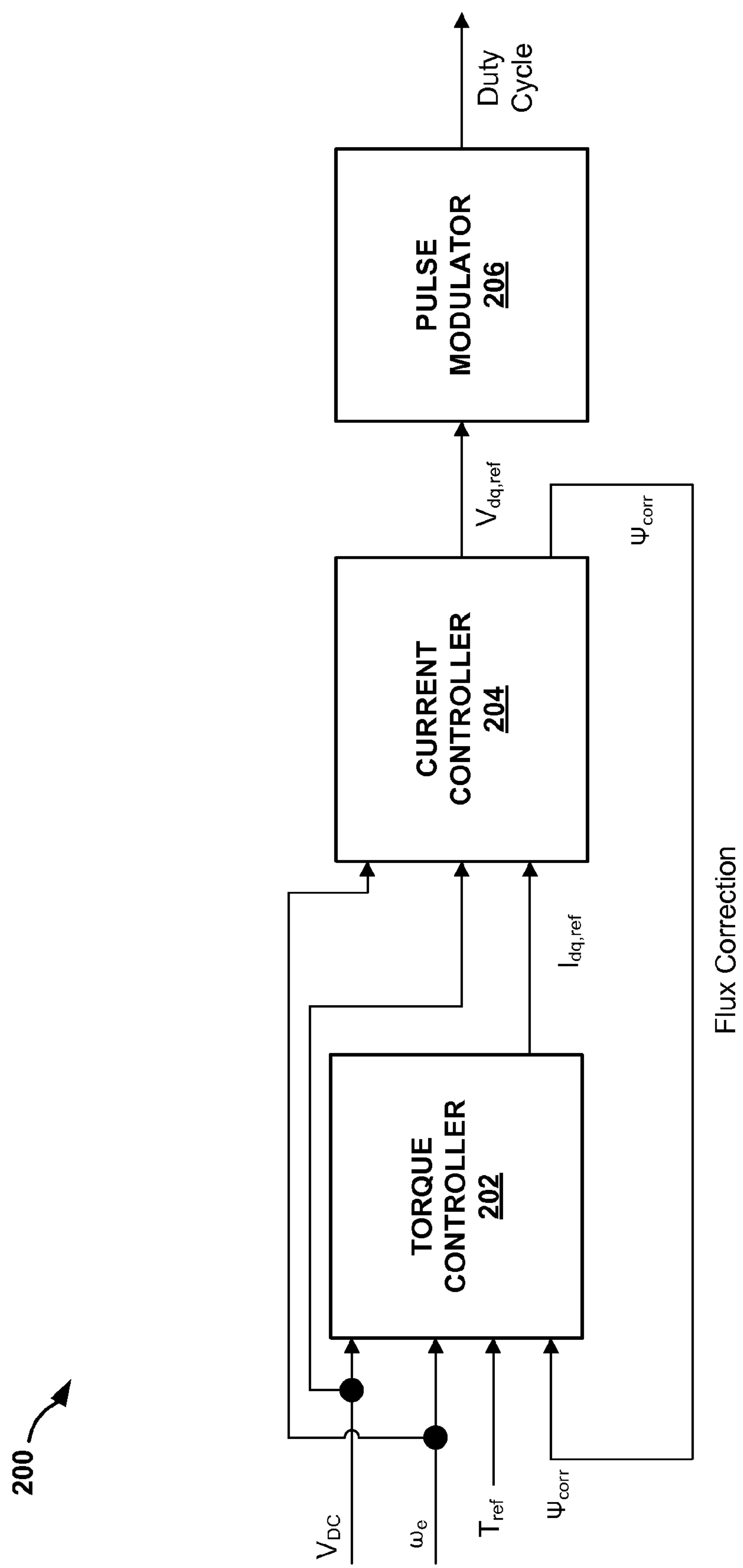
FIG. 2 is a block diagram illustrating an example controller in accordance with one or more aspects of this disclosure.

FIG. 2 is a block diagram illustrating an example controller 200 in accordance with one or more aspects of this disclosure. Controller 200 may include a torque control module 202, current control module 204, and pulse modulator 206. Controller 200 may control the inverter 106 via modules 202, 204, and 206. As a result, controller 200 may control multi-phase motor 108.

Torque control module 202 may include a plurality of inputs and at least one output. In some examples, inputs to torque control module 202 may include a DC voltage $V_{DC}$, motor velocity $\omega_e$, reference torque $T_{ref}$, and flux correction value $\Psi_{corr}$. In some examples, torque control module 202 may output reference currents $I_d$ and $I_q$ (collectively labeled as $I_{dq,ref}$ for simplicity). The relationship between the torque control module inputs and outputs are described more fully with reference to FIG. 3.

Current control module 204 may include a plurality of inputs and at least one output. In some examples, inputs to current control module 204 include motor velocity, reference torque, and the DQ reference currents ($V_{DC}$, $\omega_e$, and $I_{dq,ref}$, respectively). Current control module 204 may output reference voltages $V_{d,ref}$ and $V_{q,ref}$ (collectively labeled as $V_{dq,ref}$ for simplicity) and a flux correction value $\Psi_{corr}$.

Controller 200 may improve operation of the multi-phase machine 101 when multi-phase machine 101 operates at field weakening velocities by using the flux correction value $\Psi_{corr}$ to update reference currents $I_{dq,ref}$, reference voltages $V_{dq,ref}$, and the duty cycle of inverter 106.

Current control module 204 may determine the reference voltages $V_{dq,ref}$ based on reference currents $I_{dq,ref}$, determine the maximum available voltage $V_{max}$ (also known as the available DC link voltage), and determine a flux correction value $\Psi_{corr}$ based on the reference voltages $V_{dq,ref}$ and the maximum available voltage $V_{max}$.

The maximum available voltage $V_{max}$, which is proportional to $V_{DC}$, depends on the applied modulation method. For example, using Space Vector Modulation (SVM), $V_{max}$ may be calculated by the formula:

$$V_{max} = \frac{V_{DC}}{\sqrt{3}} \quad \text{Equation 1}$$

In some examples, the flux correction value $\Psi_{corr}$ may be calculated by integrating the difference ($\Delta V$) between reference voltages $V_{dq,ref}$ and $V_{max}$, as shown by the formula:

$$:\Psi corr=\int \Delta V\, dt \quad \text{Equation 2}$$

In some examples, the difference ($\Delta V$) between reference voltages $V_{dq,ref}$ and $V_{max}$ may be calculated by the formula:

$$:\Delta V=k*V_{max}-|V_{dq,ref}| \quad \text{Equation 3}$$

where $$:|V_{dq,ref}|=\sqrt{V_{d,ref}^2+V_{q,ref}^2} \quad \text{Equation 4}$$

and "k" (also called the flux correction coefficient) is a factor chosen to produce the flux correction effect. In some examples, the flux correction coefficient is a percentage between approximately 70% and approximately 100%. However, the flux correction coefficient may be any value suitable to produce a flux correction effect. In some examples, the flux correction coefficient may be predetermined. In some examples, controller 200 may determine the flux correction coefficient based on operating characteristics (e.g., speed, acceleration, or temperature of multi-phase motor 108). In some examples, the flux correction value $\Psi_{corr}$ may be fed back to torque control module 202.

In some examples, current control module 204 may output reference voltages $V_{dq,ref}$ to pulse modulator 206. Pulse modulator 206 may include one or more pulse modulation devices. Pulse modulator 206 may operate according to pulse density modulation (PDM), pulse width modulation (PWM), pulse frequency modulation (PFM), or another suitable modulation technique. Pulse modulator 206 may receive reference voltages $V_{dq,ref}$ from current controller 204. Pulse modulator 206 may adjust the duty cycle of inverter 106 based on reference voltages $V_{dq,ref}$. As a result, controller 200 may improve the operation of multi-phase machine 101 at field weakening speeds.

Figure 3:
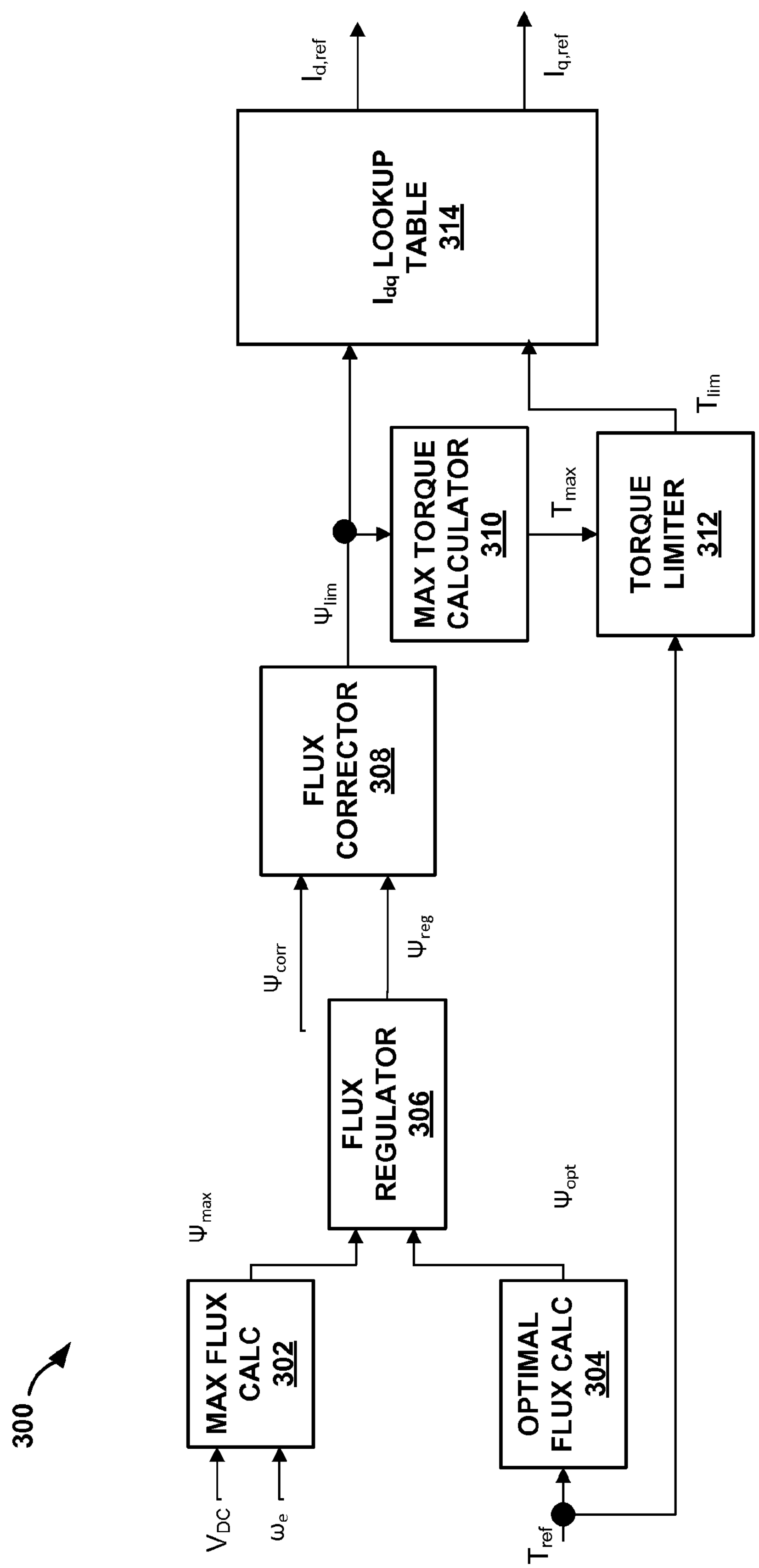
FIG. 3 is a block diagram illustrating an example torque control module in accordance with one or more aspects of this disclosure.

FIG. 3 is a block diagram illustrating an example torque control module 300 in accordance with one or more aspects of this disclosure. Torque control module 300 may include maximum flux calculator 302, optimal flux calculator 304, flux regulator 306, flux corrector 308, maximum torque calculator 310, torque limiter 312, and lookup table 314.

Torque control module 300 may include a plurality of inputs and at least one output. In some examples, inputs to torque control module 300 include a DC voltage ($V_{DC}$), motor velocity $\omega_e$, reference torque $T_{ref}$, and flux correction value $\Psi_{corr}$. In some examples, torque control module 300 may output reference currents $I_{dq,ref}$.

Maximum flux calculator 302 may receive a DC voltage $V_{DC}$ and an indication of the motor velocity $\omega_e$. Since flux is a function of DC voltage and motor speed, maximum flux calculator 302 may determine a maximum available flux $\Psi_{max}$ and output an indication of the maximum available flux. Optimal flux calculator 304 may receive an indication of the reference torque and determine an optimal flux $\Psi_{opt}$ based upon the max torque per ampere (MTPA) condition. Optimal flux calculator 304 may output an indication of the optimal flux $\Psi_{opt}$.

Flux regulator 306 may receive an indication of the maximum available flux and an indication of the optimal flux. Flux regulator 306 may determine a regulated flux $\Psi_{reg}$ based on the received values. In some examples, the regulated flux may be set equal to the minimum of the optimal flux $\Psi_{opt}$ and the maximum available flux $\Psi_{max}$. Flux regulator 306 may output an indication of the regulated flux $\Psi_{reg}$.

Flux corrector 308 may receive the indication of the regulated flux and the flux correction value and determine a flux limit $\Psi_{lim}$. In some examples, the flux limit may be set to the greater of the flux correction value and the regulated flux. Flux corrector 308 may output an indication of the flux limit $\Psi_{lim}$.

Maximum torque calculator 310 may receive the indication of the flux limit and determine a maximum available torque $T_{max}$ based on the maximum torque per flux (MTPF) condition. Maximum torque calculator 310 may output an indication of the maximum available torque $T_{max}$. Torque limiter 312 may receive the indication of the maximum torque $T_{max}$ and the reference torque $T_{ref}$ and determine a torque limit $T_{lim}$. In some examples, torque limiter 312 may set the torque limit $T_{lim}$ equal to greater of the maximum available torque $T_{max}$ and the reference torque $T_{ref}$. Torque limiter 312 may output an indication of the torque limit $T_{lim}$.

Torque control module 300 may compare the indication of the flux limit $\Psi_{lim}$ and the indication of the torque limit $T_{lim}$ to $I_{dq}$ lookup table 314. $I_{dq}$ lookup table 314 may include a mapping between the flux limit $\Psi_{lim}$ and torque limit $T_{lim}$ to the reference currents $I_{dq,ref}$. Torque control module 300 may determine the reference currents $I_{dq,ref}$ based on the $I_{dq}$ lookup table 314 and output the determined reference currents $I_{dq,ref}$. In some examples, torque control module 300 may determine reference currents $I_{dq,ref}$ without lookup table 314. For example, torque control module 300 may compute reference currents $I_{dq,ref}$ based directly on the MTPA and MPTF conditions. As described with reference to FIG. 2, current control module 204 may receive the indication of the reference currents $I_{dq,ref}$ and determine reference voltages $V_{dq,ref}$ based on the received reference currents $I_{dq,ref}$.

Figure 4:
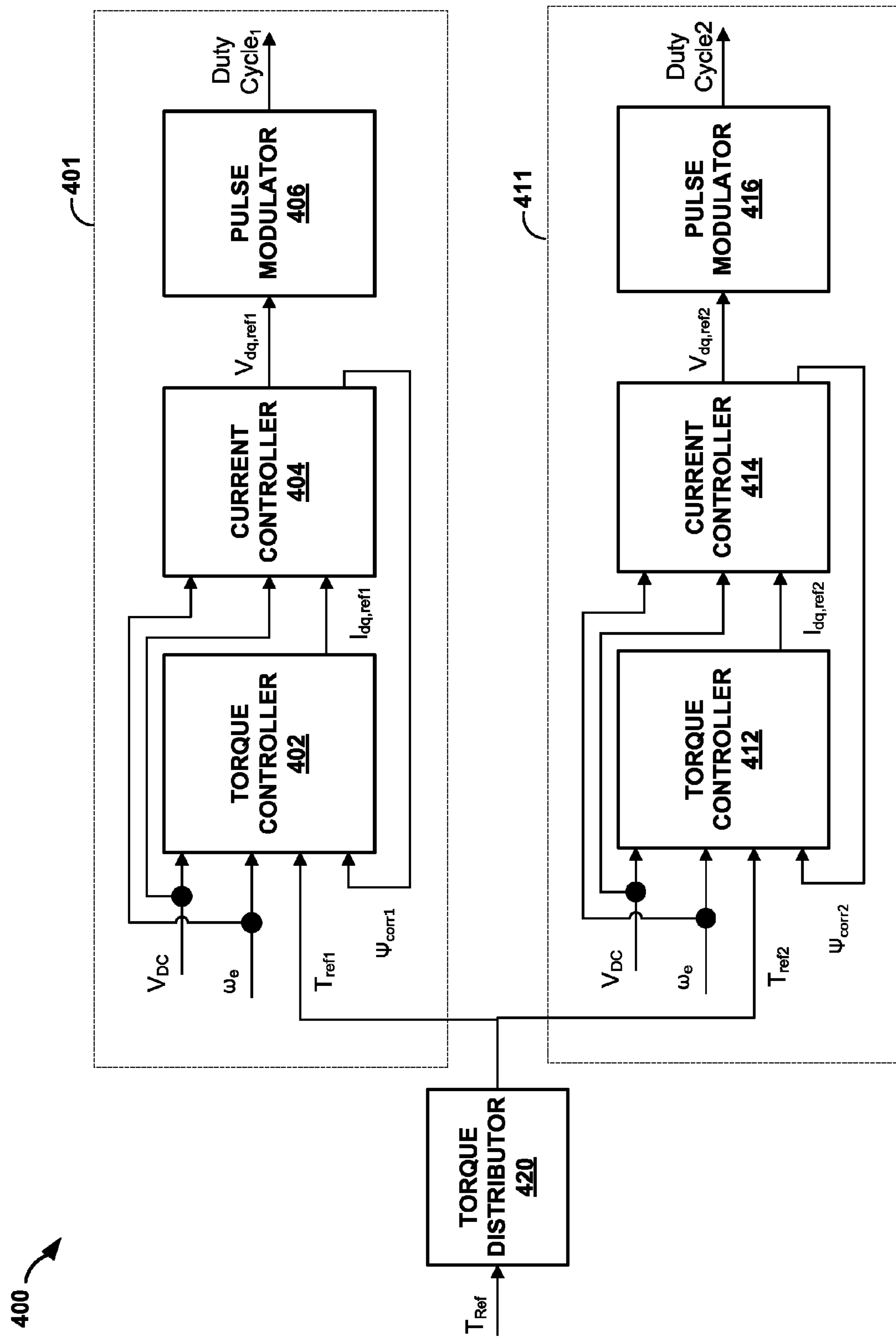
FIG. 4 is a block diagram illustrating an example controller in accordance with one or more aspects of this disclosure.

FIG. 4 is a block diagram illustrating an example controller 400 in accordance with one or more aspects of this disclosure. Controller 400 may be configured to treat multi-phase motor 108 (FIG. 1) as a plurality of virtual multi-phase motors. Controller 400 may be configured to control N-phase motor 108 as any number of virtual multi-phase motors, where each virtual multi-phase motor includes any number of phases. For example, controller 400 may control two virtual motors, three virtual motors, or any number of virtual motors. In some examples, each virtual multi-phase motor may include the same number of phases. For example, multi-phase motor 108 may include six phases and controller 400 may be configured to control two virtual multi-phase motors, each virtual motor with three phases. However, the number of phases in each virtual multi-phase motor may be different. For example, multi-phase machine 101 may include seven phases and controller 400 may be configured to control two virtual multi-phase motors, where the first virtual motor includes three phases and the second virtual multi-phase motor includes four phases.

For ease of illustration only, multi-phase machine 101 is described as a six-phase machine and controller 400 is described as controlling two virtual multi-phase motors each with three phases. However, in other examples, the number of virtual motors may be greater than two, and/or the number of phases per virtual motor may be greater than three.

From the perspective of controller 400, each of the virtual multi-phase motors shares a shaft and rotor. Since each of the virtual multi-phase motors shares the same physical structure, one might expect that each virtual three-phase motor is symmetrical and that the currents in each virtual three-phase motor would be identical. However, in some examples, the currents in each virtual three-phase motor are not identical. In some examples, different stator currents may create harmonics in multi-phase motor 108. Some harmonics may be undesirable because they may cause higher temperatures. In turn, higher temperatures may degrade or de-magnetize the permanent magnets in the rotor. In some examples, controller 400 may determine a flux correction value $\Psi_{corr}$ based on the actual currents in each virtual three-phase motor. The flux correction value $\Psi_{corr}$ may allow controller 400 to perform field weakening by adjusting the flux and reference currents $I_{dq,ref}$, which may, in some examples, reduce or eliminate undesirable harmonics in multi-phase motor 108 and reduce or prevent damage to the permanent magnets.

Controller 400 may include torque distribution module 420 and subsystems 401, 411. Subsystems 401, 411 may each control one of the virtual multi-phase motors. Each subsystem 401, 411 may include a torque control module (402, 412, respectively), current control module (404, 414, respectively), and pulse modulator (406, 416, respectively). Controller 400 may include additional subsystems depending on the number of virtual multi-phase motors. For example, if controller 400 includes three virtual multi-phase motors, controller 400 may include three subsystems.

Torque distribution module 420 may distribute reference torque $T_{ref}$ between the subsystems. For example, torque distribution module 420 may distribute one half of reference torque $T_{ref}$ to torque control module 402 and torque control module 412 such that $$T_{ref1} = \frac{Tref}{2}$$

and $$T_{ref2} = \frac{Tref}{2}.$$

In some examples, torque distribution module 420 may distribute reference torque $T_{ref}$ unequally.

Torque control module 402 may receive a plurality of inputs and at least one output. In some examples, inputs to torque control module 402 include a DC voltage $V_{DC}$, motor velocity $\omega_e$, and reference torque $T_{ref1}$. Torque control module 402 may determine reference currents $I_{dq,ref1}$ from $I_{dq}$ lookup table 314 based on the inputs and output the reference currents, as described with reference to FIG. 3. Current control module 404 may receive the reference currents $I_{dq,ref1}$, DC voltage $V_{DC}$, and an indication of the motor velocity $\omega_e$. Current control module 404 may determine reference voltages $V_{dq,ref1}$ based on the received reference currents $I_{dq,ref1}$, as discussed with reference to FIG. 2. Current control module 404 may also determine a flux correction value $\Psi_{corr1}$ and output an indication of flux correction value $\Psi_{corr1}$. In some examples, the flux correction value may be determined based on reference voltages $V_{dq,ref1}$ and $V_{max}$, as described with reference to FIG. 2. Torque control module 402 may receive the indication of flux correction value $\Psi_{corr1}$ and adjust reference currents $I_{dq,ref1}$ based on flux correction value $\Psi_{corr1}$.

Likewise, subsystem 411 may determine reference currents $I_{dq,ref2}$ and reference voltages $V_{dq,ref2}$ based on DC voltage $V_{DC}$, motor velocity $\omega_e$, and reference torque $T_{ref2}$. Subsystem 411 may also determine flux correction value $\Psi_{corr2}$ and update reference currents $I_{dq,ref2}$ and reference voltages $V_{dq,ref2}$ based on flux correction value $\Psi_{corr2}$.

Controller 400 may determine flux correction values $\Psi_{corr1}$, $\Psi_{corr2}$ independently of one another. Controller 400 may independently adjust reference voltages $V_{dq,ref1}$, $V_{dq,ref2}$ based on the respective flux correction values $\Psi_{corr1}$, $\Psi_{corr2}$ and output reference voltages $V_{dq,ref1}$, $V_{dq,ref2}$ to pulse modulators 406, 416, respectively. Pulse modulators 406, 416 may modulate the duty cycle of the respective inverters, which may assist field weakening control for the respective virtual multi-phase motors. Accordingly, controller 400 may reduce or eliminate undesirable harmonics in multi-phase motor 108 and prevent or reduce damage to the permanent magnet.

Figure 5:
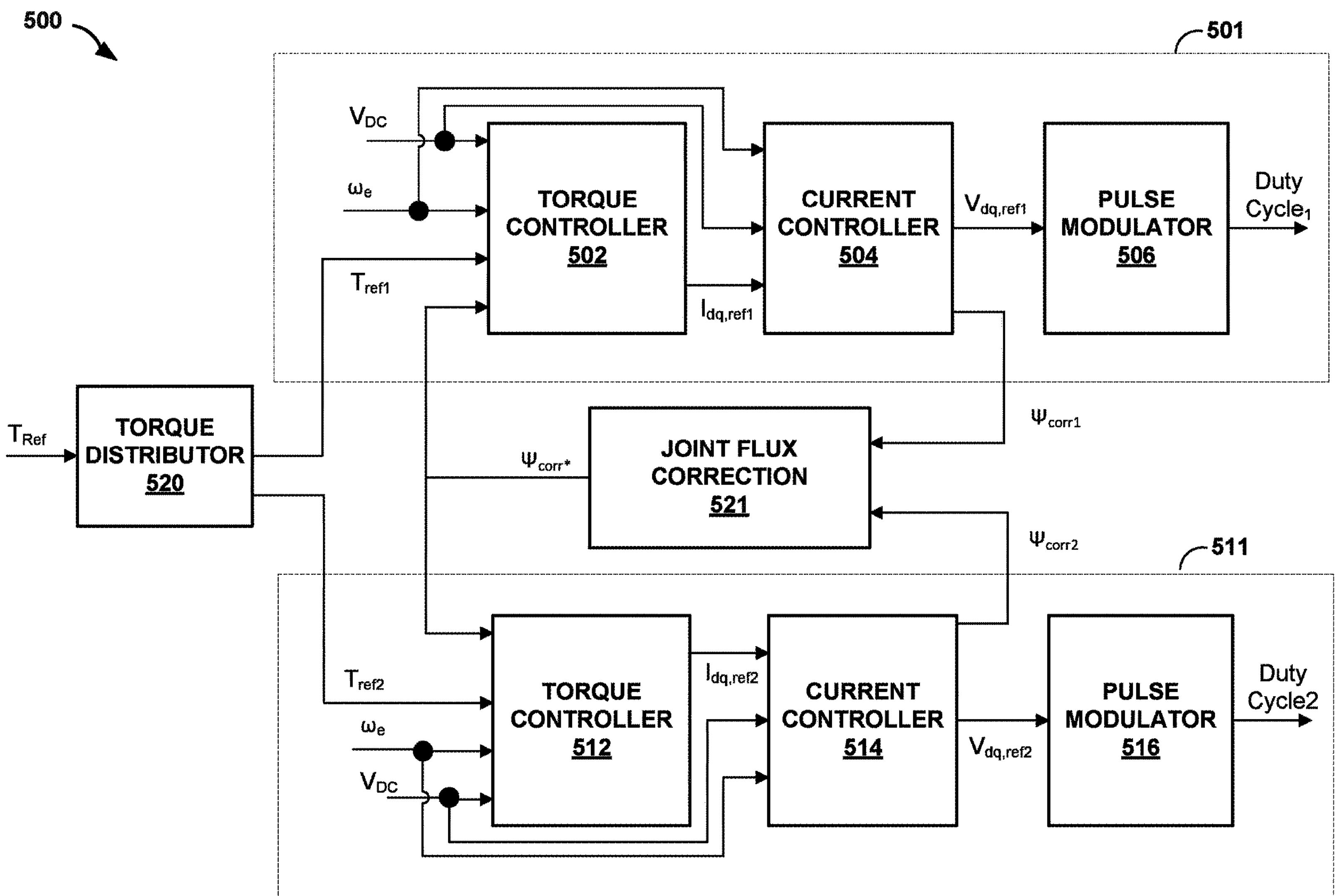
FIG. 5 is a block diagram illustrating an example controller in accordance with one or more aspects of this disclosure.

FIG. 5 is a block diagram illustrating an example controller 500 in accordance with one or more aspects of this disclosure. Controller 500 may be configured to treat multi-phase motor 108 (FIG. 1) as a plurality of virtual multi-phase motors. Controller 500 may be configured to control N-phase motor 108 as M virtual multi-phase motors, where M is any positive integer and each virtual multi-phase motor includes any number of phases. For ease of illustration only, multi-phase machine 101 is described as a six-phase machine and controller 500 is described as controlling two virtual multi-phase motors each with three phases.

Controller 500 may include torque distribution module 520. Torque distribution module 520 may distribute reference torque $T_{ref}$ between the subsystems. For example, torque distribution module 520 may distribute one half of reference torque $T_{ref}$ to torque control module 502 and torque control module 512 such that $$T_{ref1} = \frac{Tref}{2}$$

and $$T_{ref2} = \frac{Tref}{2}.$$

In some examples, torque distribution module 520 may distribute reference torque $T_{ref}$ unequally.

Controller 500 may include subsystems 501 and 511, each of which controls one of the virtual multi-phase motors. Controller 500 may include additional subsystems depending on the number of virtual multi-phase motors. For example, if controller 500 includes three virtual multi-phase motors, controller 500 may include three subsystems. Each subsystem 501, 511 may include a torque control module (502, 512, respectively), current control module (504, 514, respectively), and pulse modulator (506, 516, respectively). In some examples, controller 500 may include torque distribution module 520 and joint flux correction module 521.

Torque control module 502 may receive a DC voltage $V_{DC}$ and indications of motor velocity $\omega_e$ and reference torque $T_{ref1}$. Torque control module 502 may determine reference currents $I_{dq,ref1}$ from $I_{dq}$ lookup table 314 based on the inputs and output the reference currents $I_{dq,ref1}$ as described with reference to FIG. 3. Current control module 504 may receive the reference currents $I_{dq,ref1}$, DC voltage $V_{DC}$, and an indication of the motor velocity $\omega_e$. Current control module 504 may determine reference voltages $V_{dq,ref1}$ based on the received reference currents $I_{dq,ref1}$, as discussed with reference to FIG. 2. Current control module 504 may also determine a flux correction value $\Psi_{corr1}$ and output flux correction value $\Psi_{corr1}$. In some examples, the flux correction value may be determined based on reference voltages $V_{dq,ref1}$ and $V_{max}$, as described with reference to FIG. 2. Likewise, subsystem 511 may determine reference currents $I_{dq,ref2}$ and reference voltages $V_{dq,ref2}$ based on the DC voltage $V_{DC}$, motor velocity $\omega_e$, and reference torque $T_{ref2}$. Current control module 514 may also determine a flux correction value $\Psi_{corr2}$ and output flux correction value $\Psi_{corr2}$.

In some examples, it may be advantageous to adjust the references currents $I_{dq,ref1}$, $I_{dq,ref2}$ and reference voltages $V_{dq,ref1}$, $V_{dq,ref2}$ based on the same flux correction value. In some examples, joint flux correction module 521 may receive the flux correction values $\Psi_{corr1}$, $\Psi_{corr2}$ and determine a joint flux correction value $\Psi_{corr*}$ based on the input flux correction values $\Psi_{corr1}$, $\Psi_{corr2}$. Joint flux correction value $\Psi_{corr*}$ may be proportional to one of flux correction values $\Psi_{corr1}$, $\Psi_{corr2}$. For example, flux correction limiter may set the joint flux correction value $\Psi_{corr*}$ equal to the minimum of flux correction values $\Psi_{corr1}$, $\Psi_{corr2}$. In some examples, if equation 3 is re-written as $\Delta V=|V_{dq,ref}|-k*V_{max}$, flux correction value $\Psi_{corr*}$ may be set equal to the maximum of flux correction values $\Psi_{corr1}$, $\Psi_{corr2}$. Joint flux correction module 521 may output joint flux correction value $\Psi_{corr*}$, which may be fed back to torque control modules 502, 512.

Torque control modules 502, 512 may receive joint flux correction value $\Psi_{corr*}$ and adjust reference currents $I_{dq,ref1}$, $I_{dq,ref2}$, respectively, based on joint flux correction value $\Psi_{corr*}$. Torque control modules 502, 512 may output the updated reference currents $I_{dq,ref1}$, $I_{dq,ref2}$. Current control modules 504, 514 may receive the updated reference currents $I_{dq,ref1}$, $I_{dq,ref2}$ and may adjust reference voltages $V_{dq,ref1}$, $V_{dq,ref2}$ based on updated reference currents $I_{dq,ref1}$, $I_{dq,ref2}$. Current control modules 504, 514 may output the reference voltages $V_{dq,ref1}$, $V_{dq,ref2}$ to the respective pulse modulators 506, 516. Pulse modulators 506, 516 may modulate the duty cycle of the respective inverters. By using the same joint flux correction value $\Psi_{corr*}$ to update the reference currents and voltages for each of the virtual three-phase motors, each of the virtual three-phase motors may operate at the same field weakening level. As a result, controller 500 may reduce or eliminate undesirable harmonics in multi-phase motor 108 more effectively than other examples which may prevent or reduce damage to the permanent magnet.

Figure 6:
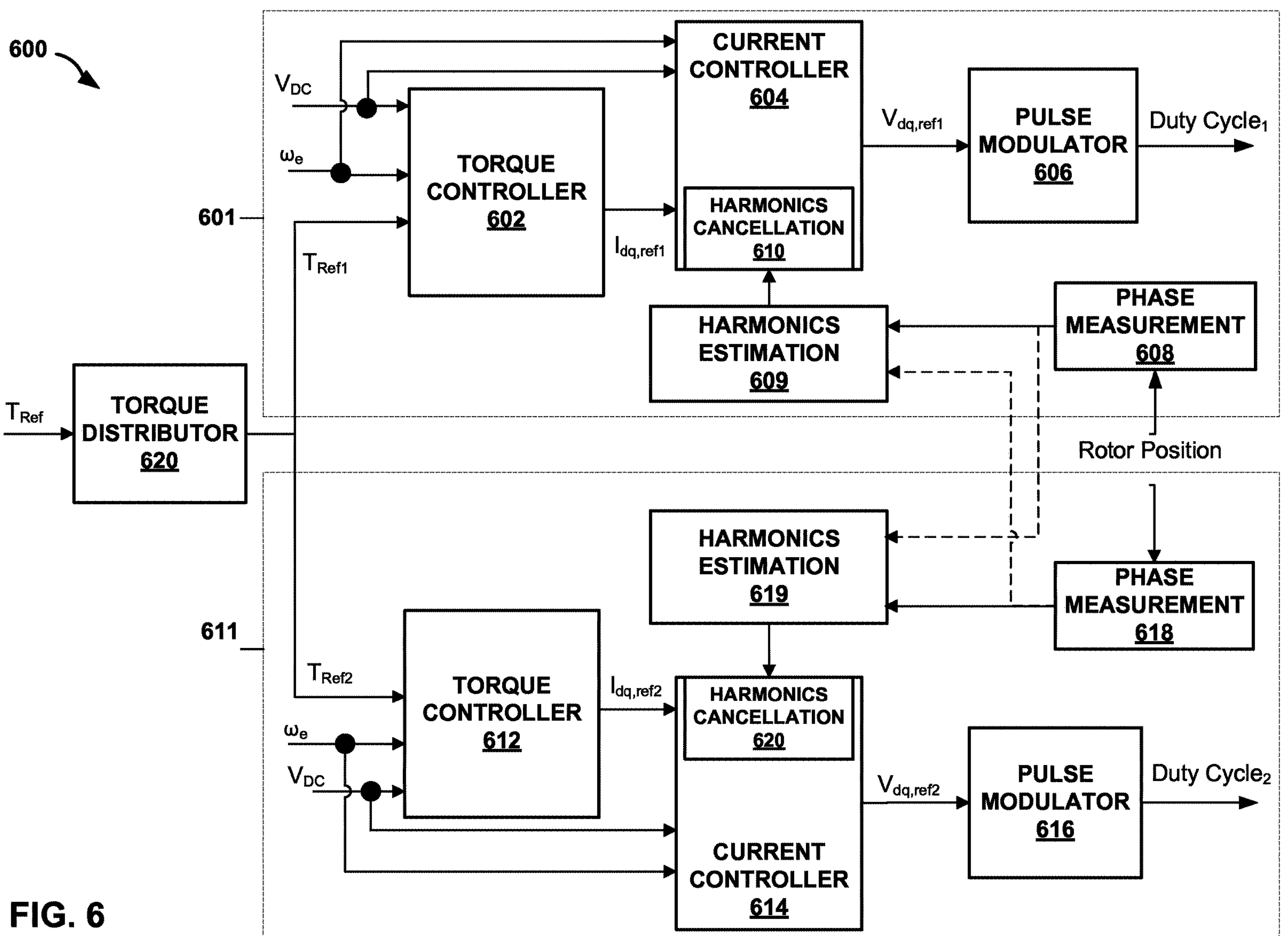
FIG. 6 is a block diagram illustrating an example controller in accordance with one or more aspects of this disclosure.

FIG. 6 is a block diagram illustrating an example controller 600 in accordance with one or more aspects of this disclosure. In some examples, controller 600 includes torque distribution module 620 and subsystems 601, 611. Controller 500 may be configured to treat multi-phase motor 108 (FIG. 1) as a plurality of virtual multi-phase motors. Controller 600 may be configured to control N-phase motor 108 as M virtual multi-phase motors, where M is any positive integer and each of the M virtual multi-phase motors include any number of phases. For ease of illustration only, multi-phase machine 101 is described as a six-phase machine and controller 600 is described as controlling two virtual multi-phase motors each with three phases. Controller 600 may include M subsystems such that each subsystem corresponds to a virtual multi-phase motor.

Subsystem 601 may include torque control module 602, current control module 604, pulse modulator 606, phase measurement module 608, and harmonics estimation module 609. Likewise, subsystem 611 may include torque control module 612, current control module 614, pulse modulator 616, phase measurement module 618, and harmonics estimation module 619.

Torque control modules 602, 612 may be substantially similar to torque control module 300 described with reference to FIG. 3. Torque control modules 602, 612 may include a plurality of inputs, such as a DC voltage $V_{DC}$, motor velocity $\omega_e$, and a reference torque ($T_{ref1}$, $T_{ref2}$, respectively). In some examples, torque control module 602, 612 may receive a flux correction value. Torque control modules 602, 612 may determine reference currents $I_{dq,ref1}$, $I_{dq,ref2}$ and output the reference currents.

Current control modules 604, 614 may include a plurality of inputs, such as a DC voltage $V_{DC}$, motor velocity $\omega_e$, and a reference current $I_{dq,ref1}$, $I_{dq,ref2}$, respectively. Current control modules 604, 614 determine a reference voltage $V_{dq,ref1}$, $V_{dq,ref1}$, respectively. Current control modules 604, 614 output the reference voltage to pulse modulators 606, 616, respectively.

Torque distribution module 620 distributes the reference torque $T_{ref}$ amongst subsystems 601, 611. Subsystems 601, 611 may operate in an "active" mode or a "passive" mode. In some examples, both subsystems 601, 611 may operate in an active mode. In some examples, one subsystem (e.g., 601) may operate in an active mode and another subsystem (e.g., 611) may operate in a passive mode. In an active mode, torque distribution module 620 distributes at least a portion of reference torque $T_{ref}$ to the torque control module for the particular subsystem. In a passive mode, torque distribution module 620 distributes zero or approximately zero torque to a particular subsystem.

In some examples, both subsystems 601, 611 operate in the active mode. Torque distribution module 620 may distribute reference torque $T_{ref}$ evenly between the subsystems. For example, torque distribution module 620 may distribute one half of reference torque $T_{ref}$ to each of torque control modules 602, 612 such that $$T_{ref1} = \frac{Tref}{2}$$

and $$T_{ref2} = \frac{Tref}{2}.$$

In some examples, where controller 600 includes M subsystems, torque distribution module 620 may distribute the torque evenly to each of the M subsystems such that each torque control module receives an amount of torque equal to $$\frac{Tref}{M}.$$

In some examples, torque distribution module 620 may distribute reference torque $T_{ref}$ unevenly such that $T_{ref1}$ is not equal to $T_{ref2}$ (e.g., $$T_{ref1} = \frac{Tref}{3}$$

and $$T_{ref2} = \frac{2*Tref}{3}\Big).$$

In some examples, controller 600 may be configured to shut down at least one of subsystems 601, 611 such that the set of phase currents for the particular subsystem are not operational, or drive at least one of subsystems 601, 611 in a passive mode. In some examples, it may be advantageous to shut down one set of phases if multi-phase machine 101 is not working properly. In some examples, shutting down one set of phases may improve efficiency or other operating characteristics (e.g., temperature, harmonics, etc.) of multi-phase machine 101.

Torque distribution module 620 may not distribute any torque to at least one of subsystems 601, 601. For example, controller 600 may be configured to treat six-phase machine 101 as two virtual three-phase motors. In some examples, controller 600 may be configured to shut down the first virtual three-phase motor such that only the second virtual multi-phase motor produces torque (i.e., the second virtual multi-phase motor is driven in an active mode). In some examples, controller 600 may be configured to treat nine-phase machine 101 as three virtual three-phase motors and may be configured to shut down at least one of the virtual multi-phase motors. For example, controller 600 may be configured to shut down one of the three virtual three-phase motors and actively drive the remaining operational virtual multi-phase motors by allocating (equally or unequally) the reference torque $T_{ref}$ to the torque control modules of the remaining operational virtual multi-phase motors. As another example, controller 600 may be configured to shut down two of the three virtual three-phase motors, such that the only operational virtual multi-phase motor is actively driven and produces a torque equal to the reference torque $T_{ref}$. In some examples, however, shutting down a virtual multi-phase motor may disturb operation of the actively driven motor and may limit multi-phase motor 108 to speeds below the field weakening speeds.

In some examples, rather than controller 600 shutting down a virtual multi-phase motor, controller 600 may be configured to passively drive the phases of a virtual multi-phase motor by allocating zero or approximately zero torque to a virtual multi-phase motor. In some examples, passively driving a virtual multi-phase machine by allocating approximately zero newton-meters of torque may reduce disturbances of the actively driven motor while still enabling multi-phase motor 108 to operate in a field weakening range.

Controller 600 may improve operation of an actively driven subsystem by incorporating harmonics detection and cancellation. Subsystem 601 of controller 600 may include phase measurement module 608, harmonics estimation module 609, and harmonics cancellation module 610. Likewise, subsystem 611 may include phase measurement module 618, harmonics estimation module 619, and harmonics cancellation module 620. Phase measurement modules 608, 618 may measure the stator currents $I_{a,b,c}$ or rotor position. Harmonics estimation modules 609, 619 may detect the presence of harmonics in multi-phase motor 108. For example, harmonics estimation modules 609, 619 may perform a fast fourier transform (FFT) analysis on the stator currents to detect the presence of harmonics (including undesirable harmonics) and determine the level of harmonics in multi-phase motor 108.

Harmonics cancellation modules 610, 620 may allow controller 600 to detect harmonics in multi-phase motor 108 and cancel or reduce undesirable harmonics to lower the amount of current or torque ripple, vibrations, and acoustic noise. Harmonics cancellation modules 610, 620 may receive an indication of the harmonics from harmonics estimation modules 609, 619 and controller 600 may adjust the currents or voltages to reduce or eliminate the undesirable harmonics. For example, current control modules 609, 619 may receive an indication of the harmonics and adjust reference voltages $V_{dq,ref1}$, $V_{dq,ref2}$ thus changing the duty cycle of the respective inverters. Adjusting the duty cycle may reduce undesirable harmonics in multi-phase motor 108 which may improve operation or longevity of multi-phase motor 108 and/or the permanent magnet.

Figure 7:
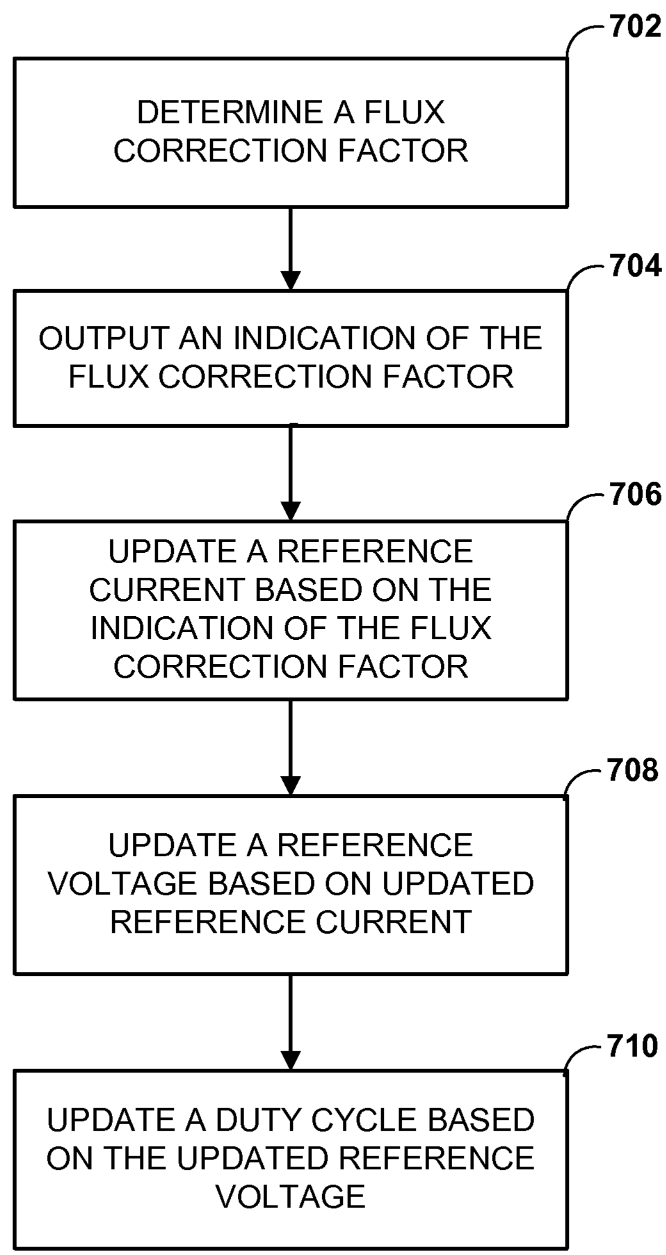
FIG. 7 is a flowchart illustrating an example method for operations of an example controller, in accordance with one or more aspects of this disclosure.

FIG. 7 is a flowchart illustrating an example method for operations of an example controller, in accordance with one or more aspects of this disclosure. In some examples, controller 500 of FIG. 5 may be configured to determine a flux correction value for each virtual motor in a multi-phase motor (702). The flux correction value may be determined by integrating the difference between the maximum available voltage and the reference voltage. Controller 500 may be configured to output an indication of the flux correction value (704) and update a reference current ($I_{dq,ref}$) based on the indication of the flux correction value (706). By updating the reference current, controller 500 may perform field weakening for multi-phase motor 108, which may improve operation of multi-phase motor 108, reduce the risk of damage to the permanent magnet, and extend the operational life-span of multi-phase motor 108. In some examples, controller 500 may be configured to control a plurality of virtual multi-phase motors and determine a joint flux correction value. By using a joint flux correction value, controller 500 may synchronize the plurality of virtual multi-phase motors, which may reduce the risk of damage to the permanent magnet. Controller 500 may be further configured to update a reference voltage ($V_{dq,ref}$) based on the updated reference current (708). Controller 500 may update a duty cycle of a pulse modulation device based on the updated reference voltage (710). Updating the reference voltage and duty cycle may allow controller 500 to improve operation of multi-phase motor 108 by enabling field-weakening and generating more flux and torque.

Figure 8:
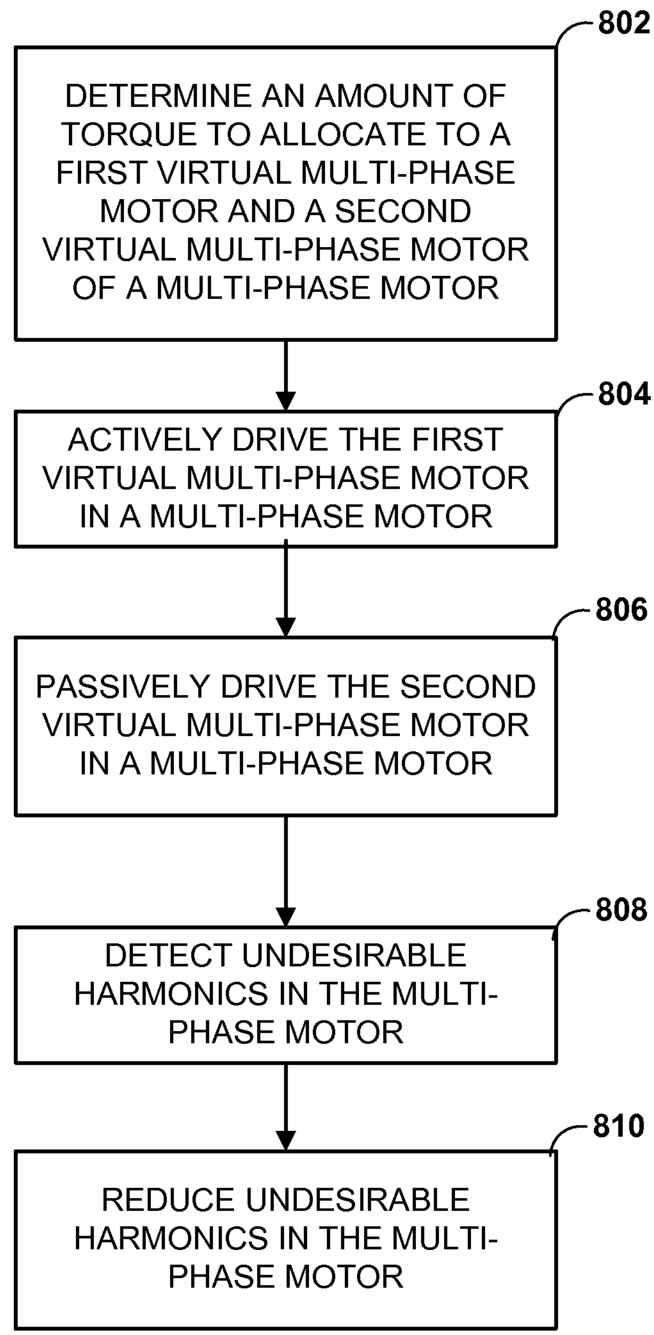
FIG. 8 is a flowchart illustrating an example method for operations of an example controller, in accordance with one or more aspects of this disclosure.

FIG. 8 is a flowchart illustrating an example method for operations of an example controller, in accordance with one or more aspects of this disclosure. In some examples, controller 600 of FIG. 6 may be configured to determine an amount of torque to allocate to a first virtual multi-phase motor and a second virtual multi-phase motor in a multi-phase motor 108 (802). Controller 600 may be configured to actively drive a first virtual multi-phase motor in a multi-phase motor (804). Controller 600 may be configured to passively drive a second virtual multi-phase motor in a multi-phase motor (806). In some examples, actively driving a first virtual multi-phase motor and passively driving a second virtual multi-phase motor may enable controller 600 to maintain redundant control of multi-phase motor 108 if one or more phases are nonoperational. Controller 600 may be configured to detect undesirable harmonics in the multi-phase motor (808). Controller 600 may be configured to reduce undesirable harmonics in multi-phase motor 108 (810). As a result, controller 600 may improve operation of multi-phase motor 108 by reducing undesirable harmonics, reducing current or torque ripple, and reducing acoustic noise.

The following examples may illustrate one or more aspects of the disclosure.

EXAMPLE 1

A controller for controlling a multi-phase motor system that includes a plurality of virtual multi-phase motors, wherein the controller is configured to: drive a first virtual multi-phase motor in an active mode; and drive a second virtual multi-phase motor in a passive mode, wherein driving the first virtual multi-phase motor in the active mode includes distributing at least a portion of a reference torque to the first virtual multi-phase motor, wherein driving the second virtual multi-phase motor in the passive mode includes distributing zero torque to the second virtual multi-phase motor.

EXAMPLE 2

The controller of example 1, wherein, in the active mode, each phase of the first virtual multi-phase motor is operational.

EXAMPLE 3

The controller of any combination of examples 1-2, wherein, in the passive mode, at least one phase of the second virtual multi-phase motor is not operational.

EXAMPLE 4

The controller of any combination of examples 1-3, wherein the controller is further configured to drive a plurality of virtual multi-phase motors in an active mode, wherein driving a plurality of virtual multi-phase motors in an active mode includes distributing the reference torque equally between each of the plurality of virtual multi-phase motors in the active mode.

EXAMPLE 5

The controller of any combination of examples 1-4, wherein the controller is further configured to detect undesired harmonics in the multi-phase motor system.

EXAMPLE 6

The controller of any combination of examples 1-5, wherein the controller is further configured to suppress the undesired harmonics.

EXAMPLE 7

The controller of any combination of examples 1-6, wherein detecting harmonics in the multi-phase motor system includes measuring a phase current and a rotor position.

EXAMPLE 8

A method for controlling a multi-phase motor system that includes a plurality of virtual multi-phase motors, the method comprising: driving a first virtual multi-phase motor in an active mode; and driving a second virtual multi-phase motor in a passive mode, wherein driving the first virtual multi-phase motor in the active mode includes distributing at least a portion of a reference torque to the first virtual multi-phase motor, wherein driving the second virtual multi-phase motor in the passive mode includes distributing zero torque to the second virtual multi-phase motor.

EXAMPLE 9

The method of example 8, wherein, in the active mode, each phase of the first virtual multi-phase motor is operational.

EXAMPLE 10

The method of any combination of examples 8-9, wherein, in the passive mode, at least one phase of the second virtual multi-phase motor is not operational.

EXAMPLE 11

The method of any combination of examples 8-10, further comprising driving a plurality of virtual multi-phase motors in an active mode, wherein driving a plurality of virtual multi-phase motors in an active mode includes distributing the reference torque equally between each of the plurality of virtual multi-phase motors in the active mode.

EXAMPLE 12

The method of any combination of examples 8-11, further comprising detecting undesired harmonics in the multi-phase motor system.

EXAMPLE 13

The method of any combination of examples 8-12, further comprising suppressing the undesired harmonics.

EXAMPLE 14

The method of any combination of examples 8-13, wherein detecting harmonics in the multi-phase motor system includes measuring a phase current and a rotor position.

EXAMPLE 15

A system comprising: a multi-phase motor system that includes a plurality of virtual multi-phase motors; and a controller for controlling the multi-phase motor system, wherein the controller is configured to: drive a first virtual multi-phase motor in an active mode; and drive a second virtual multi-phase motor in a passive mode, wherein driving the first virtual multi-phase motor in the active mode includes distributing at least a portion of a reference torque to the first virtual multi-phase motor, wherein driving the second virtual multi-phase motor in the passive mode includes distributing zero torque to the second virtual multi-phase motor.

EXAMPLE 16

The system of example 15, wherein, in the active mode, each phase of the first virtual multi-phase motor is operational.

EXAMPLE 17

The system of any combination of examples 15-16, wherein, in the passive mode, at least one phase of the second virtual multi-phase motor is not operational.

EXAMPLE 18

The system of any combination of examples 15-17, wherein the controller is further configured to drive a plurality of virtual multi-phase motors in an active mode, wherein driving a plurality of virtual multi-phase motors in an active mode includes distributing the reference torque equally between each of the plurality of virtual multi-phase motors in the active mode.

EXAMPLE 19

The system of any combination of examples 15-18, wherein the controller is further configured to detect undesired harmonics in the multi-phase motor system.

EXAMPLE 20

The system of any combination of examples 15-19, wherein the controller is further configured to suppress the undesired harmonics.

The aforementioned examples are used to show examples or applications that are applicable to the techniques and circuits described herein. In one or more examples, the functions described may be implemented in hardware, software, firmware, or any combination thereof. For example, one or more of the controllers described herein implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A controller for controlling a multi-phase motor system that includes a plurality of virtual multi-phase motors, wherein the controller is configured to:

drive a first virtual multi-phase motor in an active mode; and in response to detecting an error in at least one phase associated with a second virtual multi-phase motor, drive the second virtual multi-phase motor in a passive mode, wherein driving the first virtual multi-phase motor in the active mode includes distributing at least a portion of a reference torque to the first virtual multi-phase motor, wherein driving the second virtual multi-phase motor in the passive mode includes distributing zero torque to the second virtual multi-phase motor.

2. The controller of claim 1, wherein, in the active mode, each phase of the first virtual multi-phase motor is operational.

3. The controller of claim 1, wherein, in the passive mode, at least one phase of the second virtual multi-phase motor is not operational.

4. The controller of claim 1, wherein the controller is further configured to drive a plurality of virtual multi-phase motors in an active mode, wherein driving a plurality of virtual multi-phase motors in an active mode includes distributing the reference torque equally between each of the plurality of virtual multi-phase motors in the active mode.

5. The controller of claim 1, wherein the controller is further configured to detect harmonics in the multi-phase motor system.

6. The controller of claim 5, wherein the controller is further configured to suppress the harmonics.

7. The controller of claim 5, wherein detecting the harmonics in the multi-phase motor system includes measuring a phase current and a rotor position.

8. A method for controlling a multi-phase motor system that includes a plurality of virtual multi-phase motors, the method comprising:

driving a first virtual multi-phase motor in an active mode; and in response to detecting an error in at least one phase associated with a second virtual multi-phase motor, driving the second virtual multi-phase motor in a passive mode, wherein driving the first virtual multi-phase motor in the active mode includes distributing at least a portion of a reference torque to the first virtual multi-phase motor, wherein driving the second virtual multi-phase motor in the passive mode includes distributing zero torque to the second virtual multi-phase motor.

9. The method of claim 8, wherein, in the active mode, each phase of the first virtual multi-phase motor is operational.

10. The method of claim 8, wherein, in the passive mode, at least one phase of the second virtual multi-phase motor is not operational.

11. The method of claim 8, further comprising driving a plurality of virtual multi-phase motors in an active mode, wherein driving a plurality of virtual multi-phase motors in an active mode includes distributing the reference torque equally between each of the plurality of virtual multi-phase motors in the active mode.

12. The method of claim 8, further comprising detecting harmonics in the multi-phase motor system.

13. The method of claim 12, further comprising suppressing the harmonics.

14. The method of claim 12, wherein detecting the harmonics in the multi-phase motor system includes measuring a phase current and a rotor position.

15. A system comprising:

a multi-phase motor system that includes a plurality of virtual multi-phase motors; and a controller for controlling the multi-phase motor system, wherein the controller is configured to:

drive a first virtual multi-phase motor in an active mode; and in response to detecting an error in at least one phase associated with a second virtual multi-phase motor, drive the second virtual multi-phase motor in a passive mode, wherein driving the first virtual multi-phase motor in the active mode includes distributing at least a portion of a reference torque to the first virtual multi-phase motor, wherein driving the second virtual multi-phase motor in the passive mode includes distributing zero torque to the second virtual multi-phase motor.

16. The system of claim 15, wherein, in the active mode, each phase of the first virtual multi-phase motor is operational.

17. The system of claim 15, wherein, in the passive mode, at least one phase of the second virtual multi-phase motor is not operational.

18. The system of claim 15, wherein the controller is further configured to drive a plurality of virtual multi-phase motors in an active mode, wherein driving a plurality of virtual multi-phase motors in an active mode includes distributing the reference torque equally between each of the plurality of virtual multi-phase motors in the active mode.

19. The system of claim 18, wherein the controller is further configured to detect harmonics in the multi-phase motor system.

20. The system of claim 18, wherein the controller is further configured to suppress the harmonics.

* * * * *